United States Patent
Hayes et al.

(10) Patent No.: US 6,463,493 B1
(45) Date of Patent: Oct. 8, 2002

(54) ADAPTIVE CARD-SENSITIVE BUS SLOT METHOD AND SYSTEM

(75) Inventors: Stuart W. Hayes; Erik A. Schuchmann, both of Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/275,842

(22) Filed: Mar. 24, 1999

(51) Int. Cl.⁷ .............................................. G06F 13/00
(52) U.S. Cl. ........................................ 710/301; 439/681
(58) Field of Search ................ 710/100, 101, 710/102, 103, 300, 301, 302; 439/680, 681, 633

(56) References Cited

U.S. PATENT DOCUMENTS

| | | | |
|---|---|---|---|
| 4,335,819 A | 6/1982 | Weisman et al. ............. 211/41 |
| 4,800,462 A | 1/1989 | Zacher et al. ................ 361/413 |
| 5,162,979 A | 11/1992 | Anzelone et al. ........... 361/415 |
| 5,528,459 A | 6/1996 | Ainsbury et al. ........... 361/737 |
| 5,589,719 A | 12/1996 | Fiset ........................... 307/131 |
| 5,627,416 A | 5/1997 | Kantner ....................... 307/119 |
| 5,733,149 A | 3/1998 | Groves et al. .............. 439/680 |
| 5,751,558 A | 5/1998 | Gullicksrud et al. ........ 361/801 |
| 5,773,901 A | 6/1998 | Kantner ....................... 307/125 |
| 5,805,903 A | 9/1998 | Elkhoury |
| 5,911,050 A | * 6/1999 | Eganh et al. ................ 710/100 |
| 5,930,493 A | * 7/1999 | MacLaren et al. ............ 439/55 |
| 6,017,248 A | * 1/2000 | Pan et al. .................... 439/681 |
| 6,159,052 A | * 12/2000 | Meng et al. ................. 439/633 |
| 6,175,889 B1 | * 1/2001 | Olarig ......................... 710/129 |
| 6,269,416 B1 | * 7/2001 | Meier et al. ................. 710/301 |

* cited by examiner

Primary Examiner—Glenn A. Auve
(74) Attorney, Agent, or Firm—Baker Botts L.L.P.

(57) ABSTRACT

An adaptive card-sensitive bus slot system and method. The method and system include a substantially universal bus slot structure. In one embodiment, the substantially universal bus slot structure includes at least one Peripheral Component Interconnect adaptive key. In another embodiment, the substantially universal bus slot structure includes at least one Peripheral Component Interconnect adaptive key piston. In another embodiment, a data processing system includes the adaptive card-sensitive bus slot system.

12 Claims, 8 Drawing Sheets

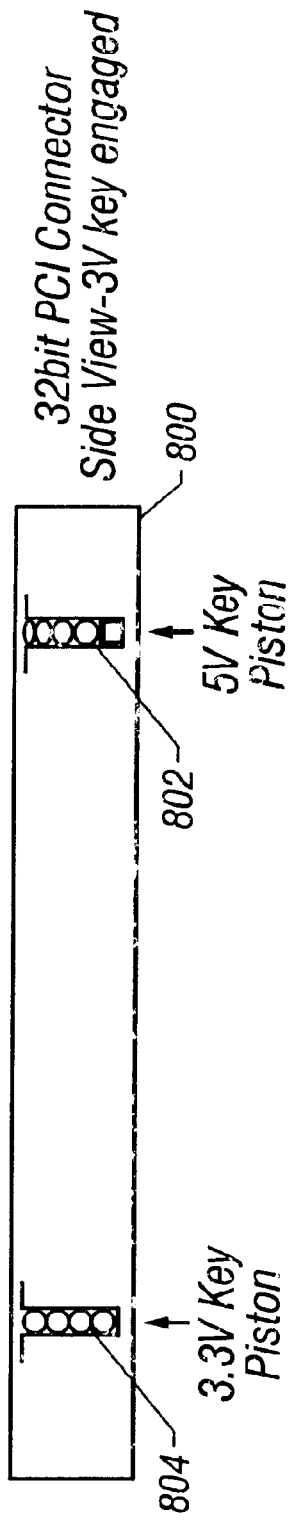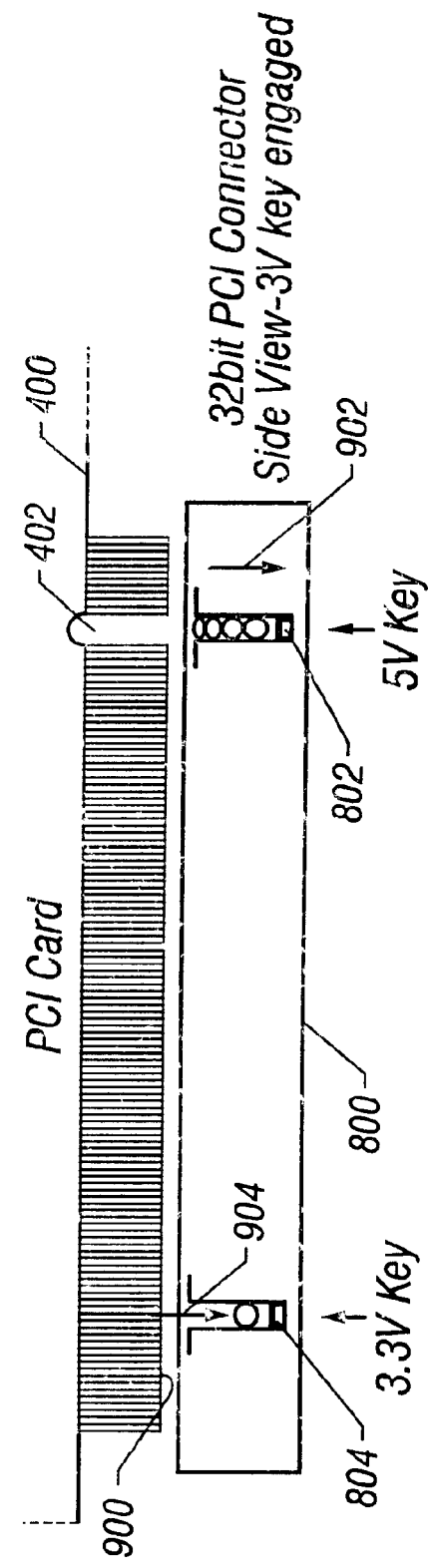
FIG. 8
FIG. 9

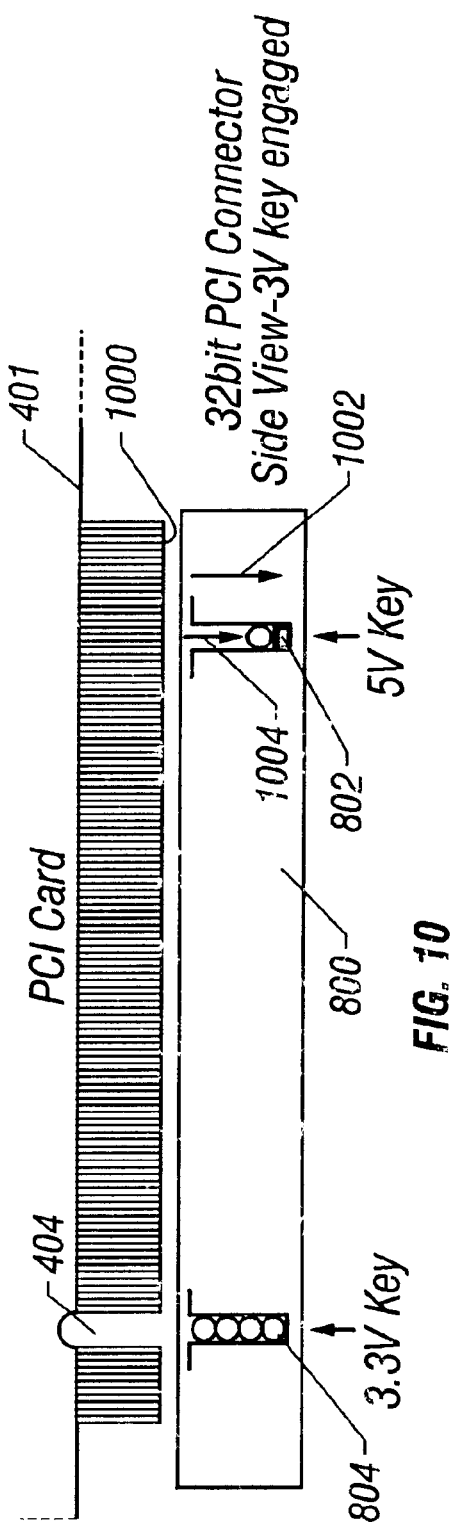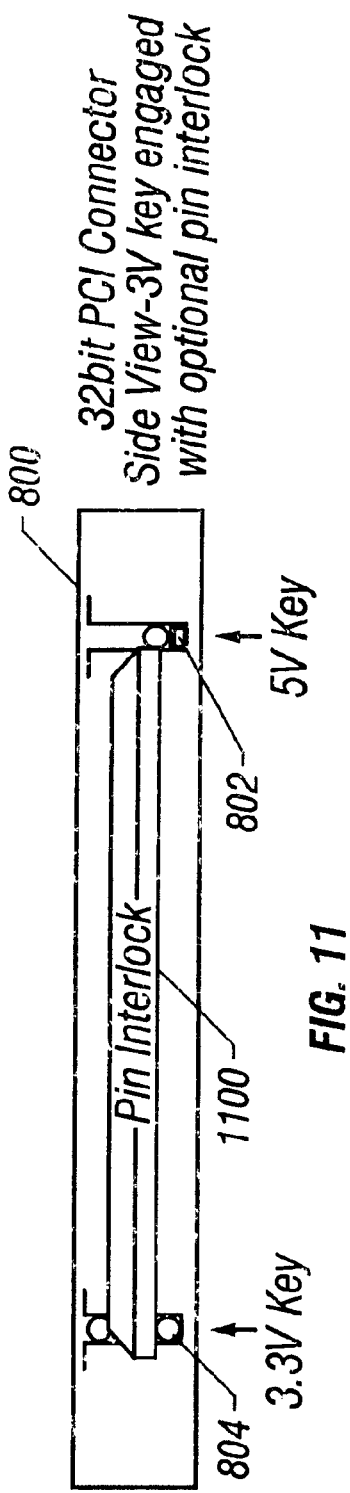

ADAPTIVE CARD-SENSITIVE BUS SLOT METHOD AND SYSTEM

BACKGROUND OF THE INVENTION

1. Field of the Invention

The present invention relates, in general, to a method and system to be utilized in data processing systems.

2. Description of the Related Art

Data processing systems are systems that manipulate, process, and store data and are notorious within the art. Personal computer systems, and their associated subsystems, constitute well known species of data processing systems.

Personal computer systems typically include a motherboard for mounting at least one microprocessor and other application specific integrated circuits (ASICs), such as memory controllers, input/output (I/O) controllers, and the like. Most motherboards include slots for additional adapter cards to provide additional function to the computer system. Typical functions that a user might add to a computer include additional microprocessors, additional memory, fax/modem capability, sound cards, graphics cards, or the like. The slots included on the motherboard generally include in-line electrical connectors having electrically conductive lands which receive exposed tabs on the adapter cards. The lands are connected to wiring layers, which in turn are connected to a bus that allows the cards to communicate with the microprocessor or other components in the system.

A personal computer system may include many different types of buses to link the various components of the system. Examples of such buses are a "local bus" which connects one or more microprocessors to the main memory, an Industry Standard Architecture (ISA) bus for sound cards and modems, a Universal Serial Bus (USB) for pointing devices, scanners, and digital cameras, a Fire Wire (IEEE-1394) for digital video cameras and high-speed storage drives, and a Peripheral Component Interconnect (PCI) bus for graphics cards, SCSI adapters, sound cards, and other peripheral devices such as isochronous devices, network cards, and printer devices.

As noted, a computer system may include a PCI bus. A PCI bus is a bus compliant with the PCI bus standard promulgated by the PCI special interest group (an unincorporated association of members of the microcomputer industry set up for the purpose of monitoring and enhancing the development of the Peripheral Component Interconnect (PCI) architecture). Specific PCI standards are available within PCI Spec. Rev. 2.1, available from the PCI special interest group, which is hereby incorporated by reference in its entirety.

Under the PCI bus specification, peripheral components can directly connect to a PCI bus without the need for glue logic. Thus, PCI is designed to provide a bus specification under which high-performance peripheral devices, such as graphics devices and hard disk drives, can be coupled to the CPU, thereby permitting these high-performance peripheral devices to avoid the general access latency and the bandwidth constraints that would have occurred if these peripheral devices were connected to a low speed peripheral bus.

The PCI bus standard is extremely extensive, and specifies aspects of many components related to the PCI standard. One such component is the PCI socket, or slot, which is utilized to allow PCI cards (devices) to plug into, or interface with, any particular PCI bus.

The PCI Rev. 2.1 standard, referenced above, calls out two types of slots: one for PCI devices which utilize 5 Volt (V) signaling, and another for PCI devices that use 3.3V signaling. Under the standard, any PCI slot connector has a key (typically a piece of plastic) in one of two positions (one position for 5V-type slots, and another position for a 3.3V slot) which disallows plugging a 5V card into a 3.3V slot, and vice-versa. The 5V cards and 3.3V cards are shaped differently such that they will only fit into a slot having the appropriate key.

PCI specifications are currently transitioning from a 33 MHz bus operating speed standard to a 66 MHz bus operating speed. The 66 MHz PCI specification requires 3.3V switching. However, the vast majority of PCI bus systems currently in existence utilize 5V switching, and thus the PCI cards deployed within such systems are 5V cards.

Since it is possible to have systems with multiple PCI buses, it is possible, and indeed likely, that situations will exist wherein a particular data processing system will have resident within it some buses which employ both 5V signaling and other buses which employ 3.3V signaling. This will be particularly true while the industry is transitioning to the newer 66 MHz standard.

In that it is likely that both 5V and 3.3V PCI slots will be resident within the same system, it is desirable to provide a "universal" system which will adapt itself to different (e.g. 5V and 3.3V) cards as appropriate. In this context, it is significant that the PCI system keys have been designed such that they must be present within the PCI slots to ensure mechanical alignment within the slot. Consequently, it is not possible to merely remove both keys to make a universal PCI slot, in that the appropriate key must be present to provide proper mechanical alignment of any card utilized.

Within the industry, the common way in which provision is made to support both 5V and 3.3V cards is via the use of a removable key that a user manually inserts into one of two locations, with one location appropriate for 5V cards and another location appropriate for 3.3V cards. This prior-art removable key scheme is illustrated in FIG. 12. Shown in FIG. 12 is a perspective view of PCI slot 1200. Depicted are 3.3V groove 1202 and 5V groove 1204 within front face 1206 and rear face 1208 and top surface 1209 of PCI slot 1200. Illustrated is removable key 1210 which may be inserted in either 3.3V groove 1202 or 5V groove 1204, as appropriate, to ensure that PCI slot 1200 can only accept either a 5V or a 3.3V expansion card. This prior art scheme solves the mechanical alignment problem but introduces two new issues: a user can lose the removable key (such removable keys are roughly the size of half a paper clip), making the slot unusable; and a removable key often must be inserted into a PCI slot that will likely be recessed 8 inches into a system chassis, surrounded on either or both sides by PCI cards or plastic insulators that are generally less than 1" apart. This typical scenario creates a box 1" wide and 8" deep at the bottom of which a user must align a small plastic piece with a tiny hole. Those skilled in the art will recognize that such placement is challenging even for experienced users.

In light of the foregoing, it is apparent that a problem exists in the industry in that current methods of providing "universal" PCI slots give rise to the foregoing noted difficulties. It is therefore apparent that a need exists for method and apparatus for providing substantially universal PCI card-slot interfacing, but which alleviate the forgoing noted difficulties.

SUMMARY OF THE INVENTION

An adaptive card-sensitive bus slot system and method have been invented which both provide substantially universal PCI card-slot interfacing and alleviate substantial difficulties extant within the related art. The method and system include a substantially universal bus slot structure. In one embodiment, the substantially universal bus slot structure includes at least one Peripheral Component Interconnect adaptive key. In another embodiment, the substantially universal bus slot structure includes at least one Peripheral Component Interconnect adaptive key piston. In another embodiment, a data processing system includes the adaptive card-sensitive bus slot system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 8 depicts an embodiment of the present invention.

FIG. 9 depicts a first plan view of a 5V PCI card to be subsequently inserted within a universal PCI slot.

FIG. 10 shows a second perspective view of a 5V PCI card inserted within a universal PCI slot.

FIG. 11 depicts an embodiment of the present invention.

The use of the same reference symbols in different drawings indicates similar or identical items.

DETAILED DESCRIPTION

The following sets forth a detailed description of the best contemplated mode for carrying out the multiple independent inventions described herein. The description is intended to be illustrative and should not be taken to be limiting. In addition, the following detailed description has been divided into sections (e.g., sections I–II) in order to highlight the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting.

I. Environment

Figure 1:
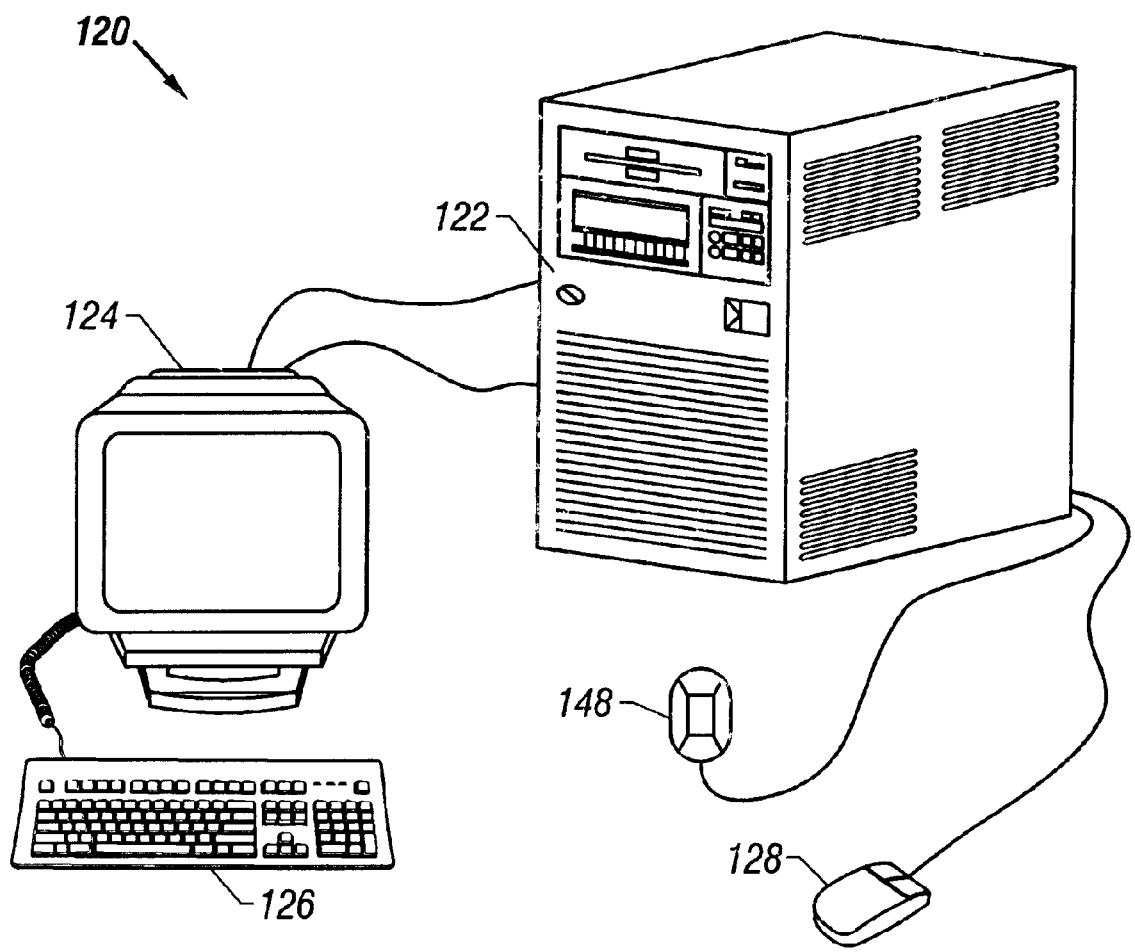
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. A graphical user interface system and method can be implemented with the data-processing system depicted in FIG. 1. A data processing system 120 is depicted which includes a system unit 122, a video display terminal 124, a keyboard 126, a mouse 128, and a microphone 148. Data processing system 120 may be implemented utilizing any suitable computer such as an IBM-compatible or an Apple-compatible personal computer.

Figure 2:
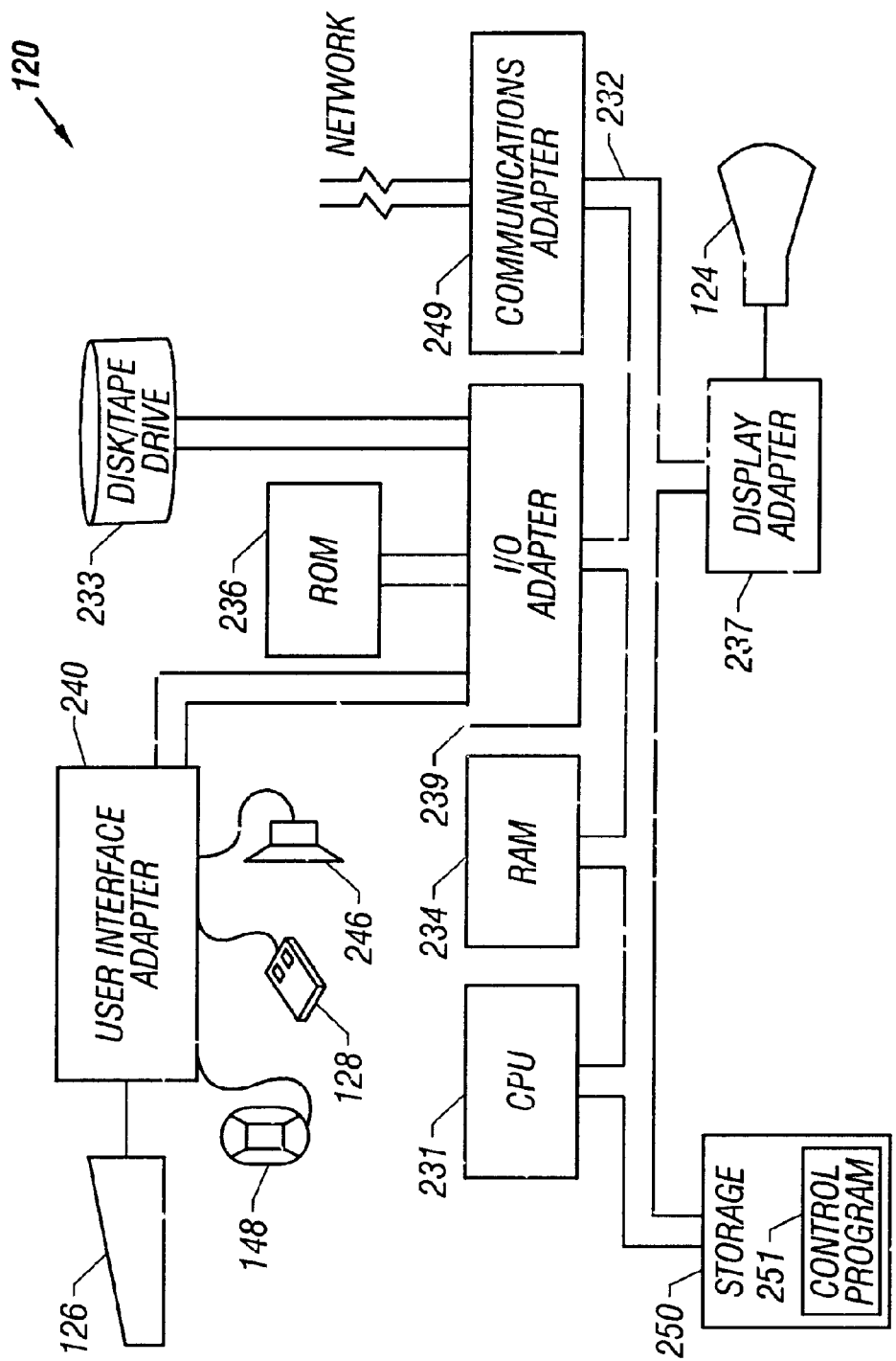
FIG. 2 illustrates a representative hardware environment, which incorporates a graphical user interface, which can be utilized in accordance with the method and system of an illustrative embodiment of the present invention.

FIG. 2 is an illustration of a representative hardware environment, which incorporates a graphical user interface, which can be utilized in accordance with the method and system of an illustrative embodiment of the present invention. FIG. 2 depicts selected components in data processing system 120 in which an illustrative embodiment of the present invention may be implemented. Data processing system 120 includes a Central Processing Unit ("CPU") 231, such as a conventional microprocessor, and a number of other units interconnected via system bus 232. Such components and units of computer 120 can be implemented in a system unit such as unit 122 of FIG. 1. Computer 120 includes random-access memory ("RAM") 234, read-only memory ("ROM") 236, display adapter 237 for connecting system bus 232 to video display terminal 124, and I/O adapter 239 for connecting peripheral devices (e.g., disk and tape drives 233) to system bus 232. Video display terminal 124 is the visual output of computer 120, which can be a CRT-based video display well-known in the art of computer hardware. However, with a portable or notebook-based computer, video display terminal 124 can be replaced with an LCD-based or a gas plasma-based flat-panel display. Computer 120 further includes user interface adapter 240 for connecting keyboard 126, mouse 128, speaker 246, microphone 148, and/or other user interface devices, such as a touch screen device (not shown), to system bus 232 through I/O adapter 239. Communications adapter 249 connects computer 120 to a data-processing network.

Any suitable machine-readable media may retain the graphical user interface, such as RAM 234, ROM 236, a magnetic diskette, magnetic tape, or optical disk (the last three being located in disk and tape drives 233). Any suitable operating system and associated graphical user interface (e.g., Microsoft Windows) may direct CPU 231. Other technologies can also be utilized in conjunction with CPU 231, such as touch-screen technology or human voice control. In addition, computer 120 includes a control program 251 which resides within computer storage 250. Control program 251 contains instructions that when executed on CPU 231 carries out the operations depicted in any examples, state diagrams, and flowcharts described herein.

Those skilled in the art will appreciate that the hardware depicted in FIG. 2 may vary for specific applications. For example, other peripheral devices such as optical disk media, audio adapters, or programmable devices, such as PAL or EPROM programming devices well-known in the art of computer hardware, and the like may be utilized in addition to or in place of the hardware already depicted.

Those skilled in the art will recognize that data processing system 120 can be described in relation to data processing systems which perform essentially the same functionalities, irrespective of architectures. As an example of such, an alternative partial architecture data processing system 120 is set forth in FIG. 3.

Figure 3:
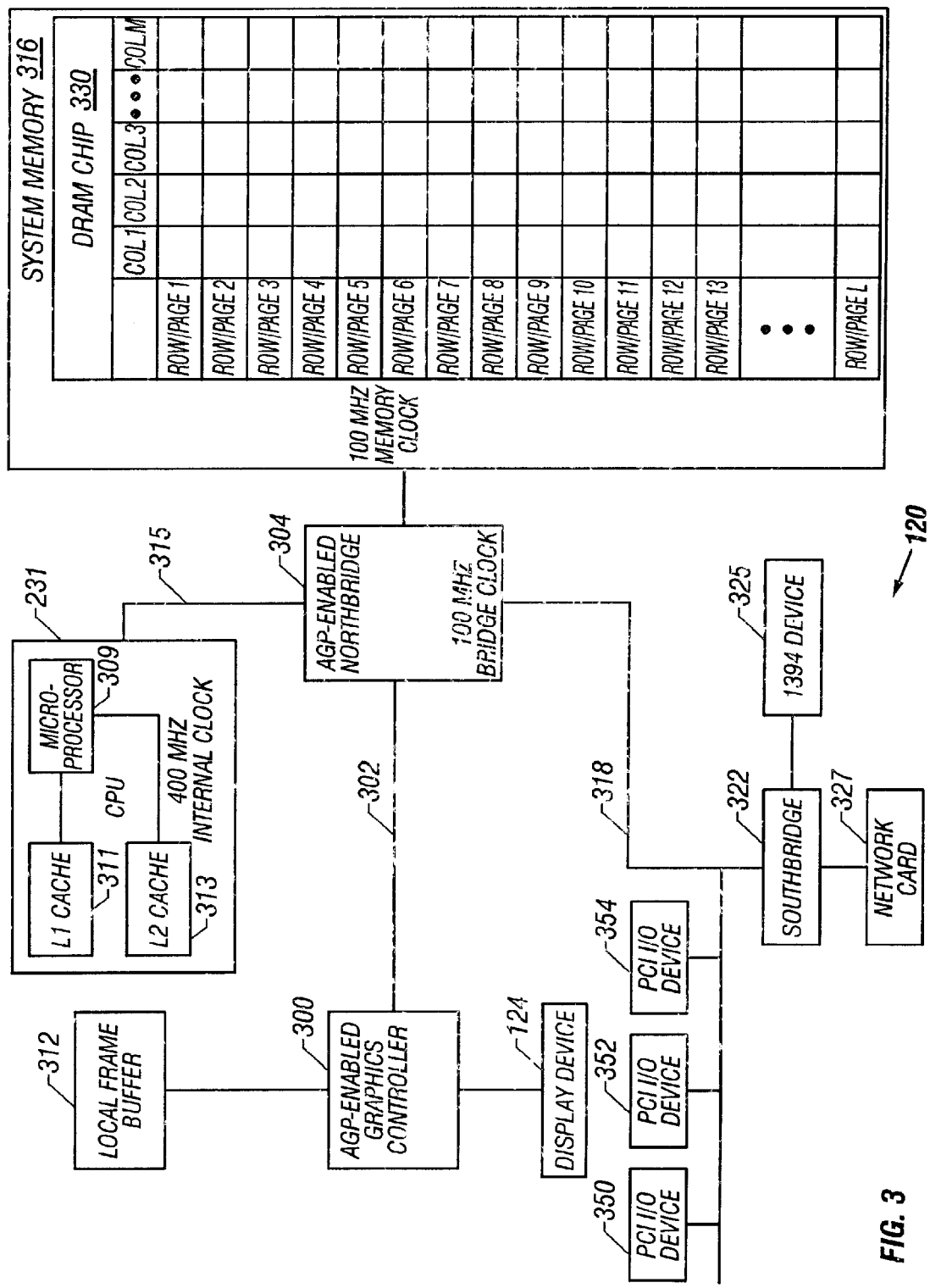
FIG. 3 shows a high-level component diagram depicting a data processing system which illustrates another environment wherein one or more embodiments of the present invention may be practiced.

Referring now to FIG. 3, shown is a high-level component diagram depicting a partial data processing system 120 which illustrates another environment wherein one or more embodiments of the present invention may be practiced. Shown are AGP-enabled graphics controller 300, AGP interconnect 302 (a data bus), and AGP-enabled Northbridge 304. Not shown, but deemed present is an AGP-enabled operating system. The term AGP-enabled is intended to mean that the so-referenced components are engineered such that they interface and function under the standards defined within the AGP interface specification (Intel Corporation, *Accelerated Graphics Port Interface Specification*, Revision 1.0 Jul. 31, 1996)). Further depicted are video display device 124, local frame buffer 312, Central Processing Unit (CPU) 231 (wherein are depicted microprocessor 309, L1 Cache 311, and L2 Cache 313), CPU bus 315, system memory 316, Peripheral Component Interconnect (PCI) bus 318, various PCI Input-Output (I/O) devices 350, 352, and 354, Southbridge 322, 1394 Device 325, and network card 327.

The foregoing components and devices are used herein as examples for sake of conceptual clarity. As for (non-exclusive) examples, CPU 231 is utilized as an exemplar of any general processing unit, including but not limited to multiprocessor units; CPU bus 315 is utilized as an exemplar of any processing bus, including but not limited to multiprocessor buses; PCI devices 350–354 attached to PCI bus 318 are utilized as an exemplar of any input-output devices attached to any I/O bus; AGP Interconnect 302 is utilized as an exemplar of any graphics bus; AGP-enabled graphics controller 300 is utilized as an exemplar of any graphics controller; Northbridge 304 and Southbridge 322 are utilized as exemplars of any type of bridge; 1394 device 325 is utilized as an exemplar of any type of isochronous source; and network card 327, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 304, Southbridge 322, and other bridges shown in that it is to be understood that such can translate and coordinate between various data buses and/or devices which communicate through the bridges.

II. Substantially Universal PCI Slot

Figure 4:
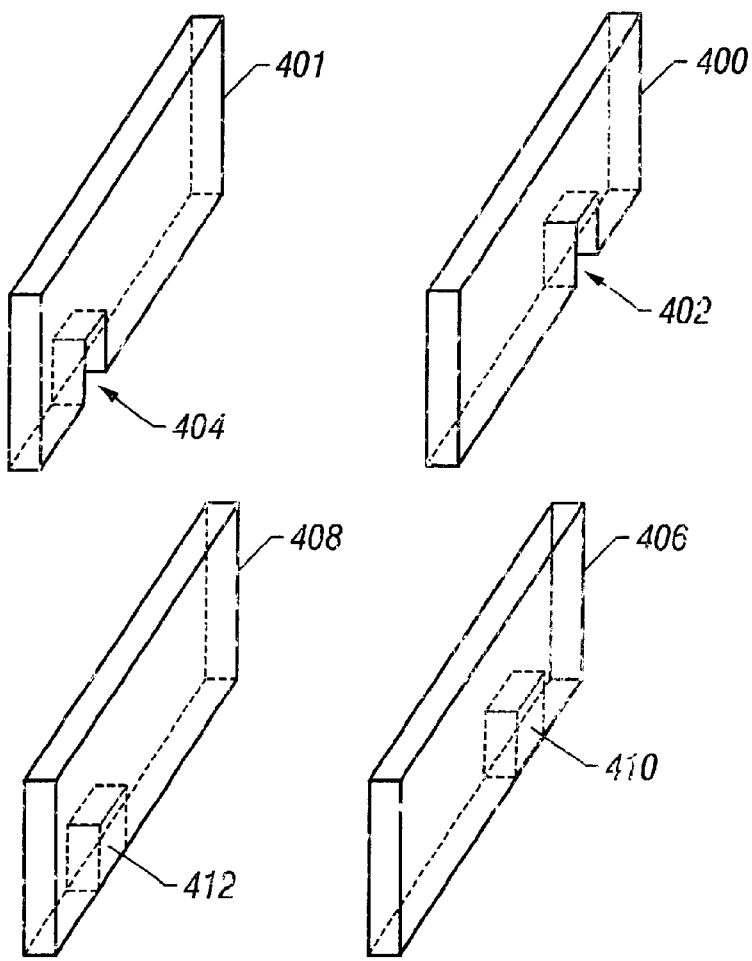
FIG. 4 illustrates related-art PCI cards and slots.

With reference now to FIG. 4, illustratively shown are related-art 5V PCI card 400 and 3.3V PCI card 401. Depicted are 5V keyhole 402 and 3.3V keyhole 404.

Illustrated are PCI slots 406 and 408. Shown is that PCI slot 406 is a 5V slot, and thus shown is that PCI slot 406 has 5V key 410 which will fit 5V keyhole 402. Depicted is that PCI slot 408 is a 3.3V slot, and thus shown is that PCI slot 408 has 3.3V key 412 which fits 3.3V keyhole 404. Notice that the keys/keyholes function such that they prevent the insertion of the inappropriate card into the inappropriate slot.

Figure 5:
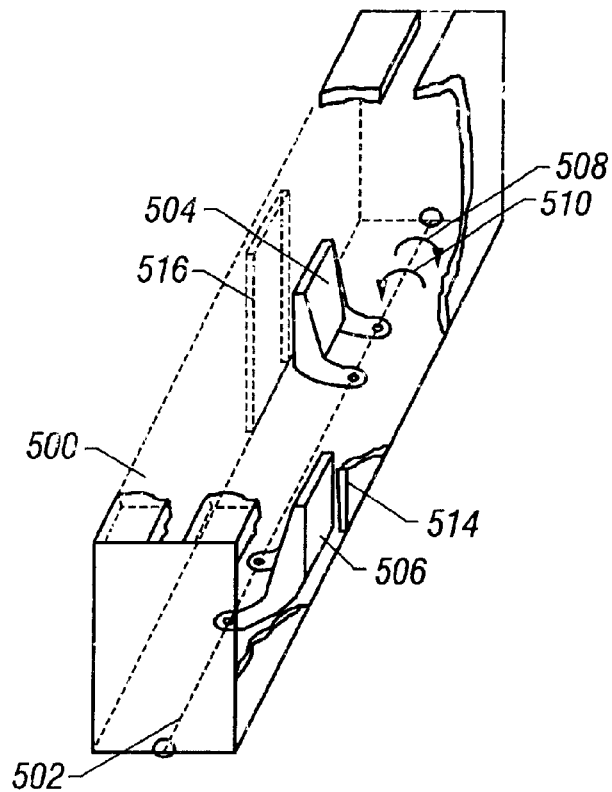
FIG. 5 depicts an embodiment of the present invention.

Referring now to FIG. 5, depicted is an embodiment of the present invention. Illustrated is universal PCI slot 500. Shown is that contained within universal PCI slot 500 is PCI adaptive key axis 502. Depicted is that affixed to PCI adaptive key axis 502 are 5V adaptive key 504 and 3.3V adaptive key 506. PCI adaptive axis 502 is affixed to universal PCI slot 500 such that PCI adaptive key axis 502 may rotate back and forth as illustrated by directions of rotation 508, 510. Also shown are 5V orifice 516 and 3.3V orifice 514 which respectively allow 5V adaptive key 504 and 3.3V adaptive key 506 to enter-exit sides of universal PCI slot 500 when PCI adaptive axis rotates in direction 508, 510.

Figure 6:
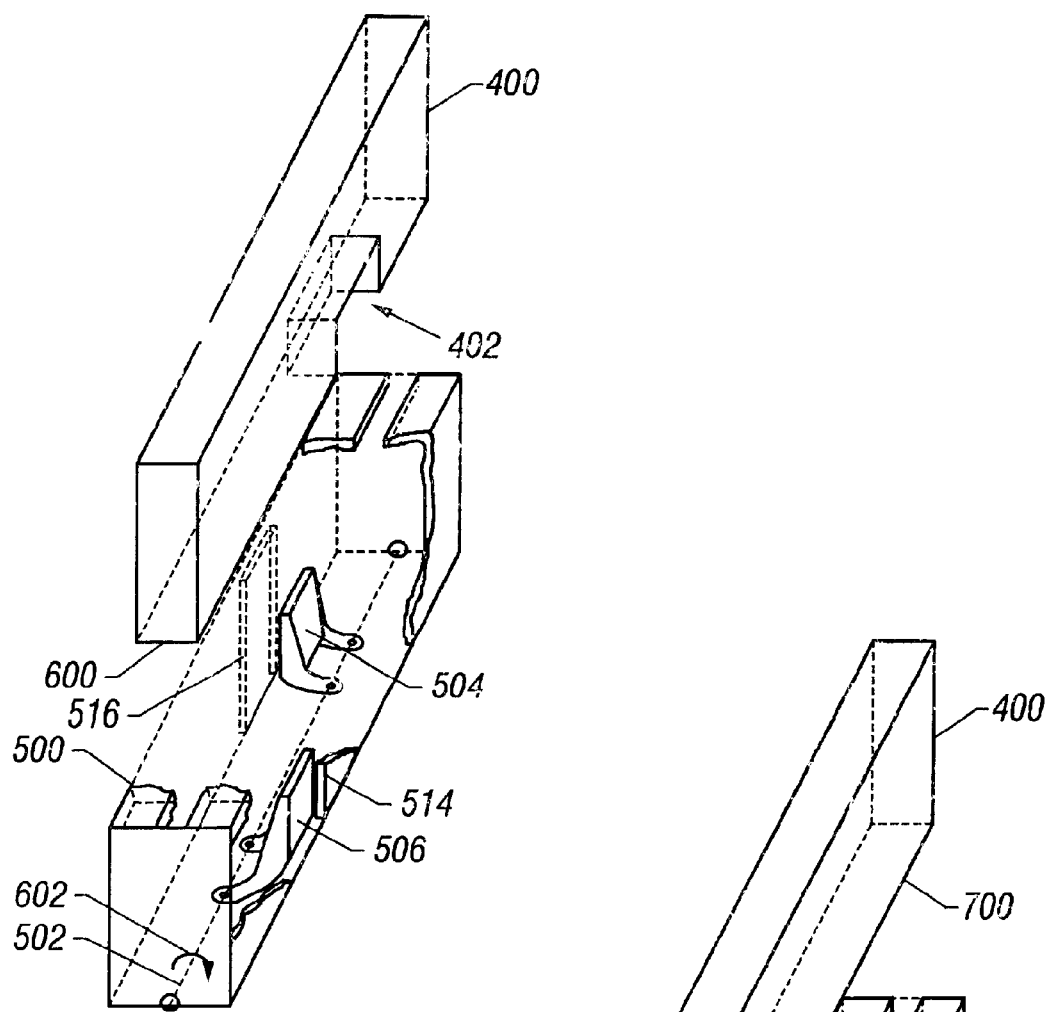
FIG. 6 shows a first perspective view of a 5V PCI card to be subsequently inserted within a universal PCI slot.

With reference now to FIG. 6, shown is a first perspective view of 5V PCI card 400 to be subsequently inserted within universal PCI slot 500. Depicted is the impending insertion of 5V PCI card 400 into universal PCI slot 500. As shown, the insertion of 5V PCI card 400 will cause lower edge 600 to contact 3.3V adaptive key 506 which will cause PCI adaptive key axis 502 to rotate in direction 602. Depicted is that as a result of the rotation in direction 602, 5V adaptive key 504 is caused to swing into the appropriate position to interface with 5V keyhole 402.

Figure 7:
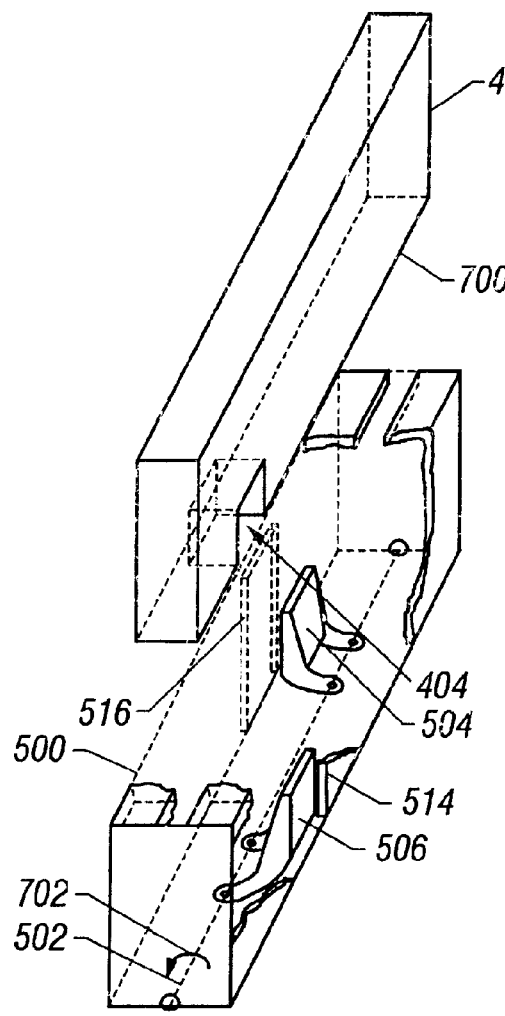
FIG. 7 shows a second perspective view of a 5V PCI card to be subsequently inserted within a universal PCI slot.
Figure 12:
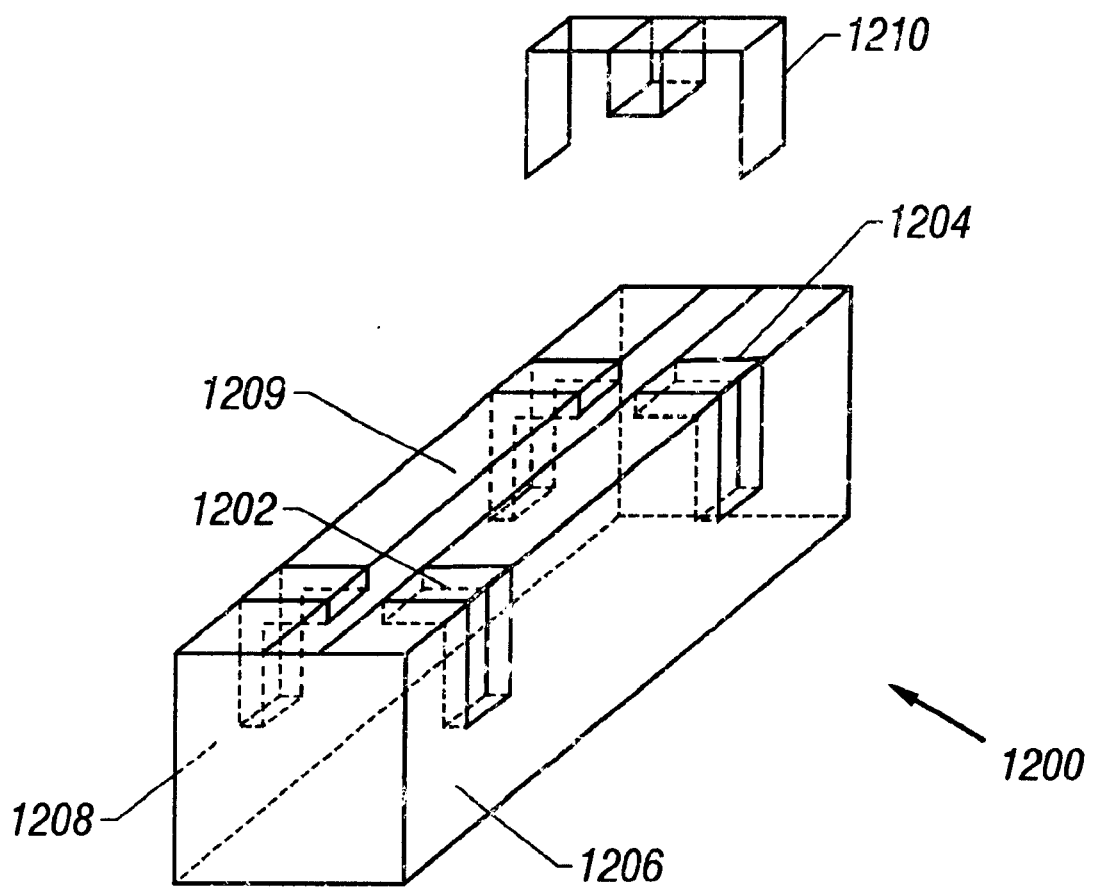
FIG. 12 illustrates a prior-art removable key scheme.

Referring now to FIG. 7, shown is a second perspective view of 5V PCI card 400 to be subsequently inserted within universal PCI slot 500. Depicted is the impending insertion of 5V PCI card 400 into universal PCI slot 500. As shown, the insertion of 5V PCI card 400 will cause lower edge 700 to contact 5V adaptive key 504 which will cause PCI adaptive key axis 502 to rotate in direction 702. Depicted is that as a result of the rotation in direction 702, 3.3V adaptive key 506 is caused to swing into the appropriate position to interface with 3.3 keyhole 404.

With reference now to FIG. 8, depicted is an embodiment of the present invention. Shown is a plan view of universal PCI slot 800. Shown is that resident within universal PCI slot 800 are 5V adaptive key piston 802 and 3.3V adaptive key piston 804. Illustrated is that 5V adaptive key piston 802 and 3.3V adaptive key piston 804 are transversely mounted within universal PCI slot 800.

With reference now to FIG. 9, depicted is a first plan view showing 5V PCI card 400 to be subsequently inserted within universal PCI slot 800. Depicted is the impending insertion of 5V PCI card 400 into universal PCI slot 800. The insertion of 5V PCI card 400 will cause lower edge 900 to contact 3.3V adaptive key piston 804, exerting a force in direction 904, which will cause 3.3V adaptive key piston 804 to compress, or retract in direction 902. Depicted for sake of illustration is that 3.3V key piston 804 is retracted, or compressed, but it is to be understood that 3.3V key piston 804 actually is compressed by the pressure applied by lower edge 900 as the card is inserted into universal PCI slot 800. Depicted for sake of illustration is that 5V adaptive key piston 802 will stay extended, or uncompressed, and thus will remain in the appropriate position to interface with 5V keyhole 402 when 5V PCI card 400 is fully inserted into universal PCI slot 800.

Referring now to FIG. 10, depicted is a second plan view showing 3.3V PCI card 401 to be subsequently inserted within universal PCI slot 800. Depicted is the impending insertion of 3.3V PCI card 401 into universal PCI slot 800. The insertion of 3.3V PCI card 401 will cause lower edge 1000 to contact 5V adaptive key piston 802, exerting a force in direction 1004, which will cause PCI 5V adaptive key piston 802, to retract, or compress, in direction 1002. Depicted for sake of illustration is that 5V key piston 802 is retracted, or compressed, but it is to be understood that 5V key piston 802 actually is compressed by the pressure applied by lower edge 1000 as the card is inserted into universal PCI slot 800. Depicted for sake of illustration is that 3.3V adaptive key piston 804 will stay extended, or uncompressed, and thus will remain in the appropriate position to interface with 3.3V keyhole 404 when 3.3V PCI card 401 is fully inserted into universal PCI slot 800.

With reference now to FIG. 11, depicted is an embodiment of the present invention. Shown is a perspective view of universal PCI slot 800. Shown is that resident within universal PCI slot 800 are 5V adaptive key piston 802 and 3.3V adaptive key piston 804. Illustrated is that 5V adaptive key piston 802 and 3.3V adaptive key piston 804 are transversely mounted within universal PCI slot 800. Further shown is interlock mechanism 1100.

Depicted is that interlock mechanism 1100 has been utilized to retract 5V adaptive key piston 802 and to lock 3.3V adaptive key piston 804 in the extended position. Not shown, but understood to be achievable, is that interlock mechanism can also be utilized to retract 3.3V adaptive key piston 802 and to lock 5V adaptive key piston 804 in the extended position.

It was mentioned in the description of related art section, above, that in the prior art a removable key is utilized to provide a "universal" slot by use of removable keys, where one key was inserted to provide a 5V slot and where another key was inserted to provide a 3.3V slot, with such keys being described as difficult to insert and easy to lose. It is significant that the embodiment described in relation FIG. 11, in addition to various other apparent advantages, achieves the same functionality as the prior art solutions, but alleviates the foregoing noted difficulties. This represents a significant achievement in the art.

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. An adaptive card-sensitive bus slot system comprising:
    a substantially universal bus slot structure including at least one adaptable key; and
    the at least one adaptable key including at least one Peripheral Component Interconnect adaptive axis.

2. The system of claim 1, wherein said at least one adaptable key further includes:
    at least one Peripheral Component Interconnect adaptive key supported by said at least one Peripheral Component Interconnect adaptive axis.

3. The system of claim 2, wherein said at least one Peripheral Component Interconnect adaptive key supported by said at least one Peripheral Component Interconnect adaptive axis further includes:
    at least one 5-Volt Peripheral Component Interconnect adaptive key.

4. The system of claim 3, further comprising:
    at least one 3.3-Volt Peripheral Component Interconnect adaptive key; and
    wherein said at least one Peripheral Component Interconnect adaptive axis rotates into position for said 5-Volt Peripheral Component Interconnect adaptive key to interface with a keyhole in a 5-Volt Peripheral Component Interconnect card when said card is inserted into said structure, causing a lower edge of said card to contact said at least one 3.3-Volt Peripheral Component Interconnect adaptive key.

5. The system of claim 2, wherein said at least one Peripheral Component Interconnect adaptive key supported by said at least one Peripheral Component Interconnect adaptive axis further includes:
    at least one 3.3-Volt Peripheral Component Interconnect adaptive key.

6. The system of claim 5, further comprising:
    at least one 5-Volt Peripheral Component Interconnect adaptive key; and
    wherein said at least one Peripheral Component Interconnect adaptive axis rotates into position for said 3.3-Volt Peripheral Component Interconnect adaptive key to interface with a keyhole in a 3.3-Volt Peripheral Component Interconnect card when said card is inserted into said structure, causing a lower edge of said card to contact said at least one 5-Volt Peripheral Component Interconnect adaptive key.

7. A method comprising:
adapting a bus slot to be a substantially universal bus slot structure wherein said adapting includes mounting at least one adaptable key with said bus slot; and
mounting at least one adaptable key with said bus slot includes mounting at least one Peripheral Component Interconnect adaptive axis within a Peripheral Component Interconnect bus slot.

8. The method of claim 7, wherein said mounting at least one Peripheral Component Interconnect adaptive axis within a Peripheral Component Interconnect bus slot further includes:
mounting at least one Peripheral Component Interconnect adaptive axis having at least one adaptive key within the Peripheral Component Interconnect bus slot.

9. The method of claim 8, wherein said mounting at least one Peripheral Component Interconnect adaptive axis having at least one adaptive key within the Peripheral Component Interconnect bus slot further includes:
mounting at least one Peripheral Component Interconnect adaptive axis having at least one 5-Volt Peripheral Component Interconnect adaptive key within the Peripheral Component Interconnect bus slot.

10. The method of claim 9, wherein said mounting at least one Peripheral Component Interconnect adaptive axis having at least one adaptive key within the Peripheral Component Interconnect bus slot further includes:
mounting at least one Peripheral Component Interconnect adaptive axis having at least one 3.3-Volt Peripheral Component Interconnect adaptive key within the Peripheral Component Interconnect bus slot; and
mounting said at least one Peripheral Component Interconnect adaptive axis such that inserting a 5-Volt Peripheral Component Interconnect card into said structure causes a lower edge of said card to contact said at least one 3.3-Volt Peripheral Component Interconnect adaptive key, and the contact causes at least one Peripheral Component Interconnect adaptive key axis to rotate into position for said 5-Volt Peripheral Component Interconnect adaptive key to interface with a keyhole in said card.

11. The method of claim 8, wherein said mounting at least one Peripheral Component Interconnect adaptive axis having at least one adaptive key within the Peripheral Component Interconnect bus slot further includes:
mounting at least one Peripheral Component Interconnect adaptive axis having at least one 3.3-Volt Peripheral Component Interconnect adaptive key within a Peripheral Component Interconnect bus slot.

12. The method of claim 11, wherein said mounting at least one Peripheral Component Interconnect adaptive axis having at least one adaptive key within the Peripheral Component Interconnect bus slot further includes:
mounting at least one Peripheral Component Interconnect adaptive axis having at least one 5-Volt Peripheral Component Interconnect adaptive key within the Peripheral Component Interconnect bus slot; and
mounting said at least one Peripheral Component Interconnect adaptive axis such that inserting a 3.3-Volt Peripheral Component Interconnect card into said structure causes a lower edge of said card to contact said at least one 5-Volt Peripheral Component Interconnect adaptive key, and the contact causes at least one Peripheral Component Interconnect adaptive key axis to rotate into position for said 3.3-Volt Peripheral Component Interconnect adaptive key to interface with a keyhole in said card.

\* \* \* \* \*